(12) United States Patent
Nauka et al.

(10) Patent No.: US 11,072,112 B2
(45) Date of Patent: Jul. 27, 2021

(54) ADDITIVE MANUFACTURING INCLUDING SELECTIVE HEATING

(71) Applicant: Hewlett-Packard Development Company, L.P., Houston, TX (US)

(72) Inventors: Krzysztof Nauka, Palo Alto, CA (US); Howard S. Tom, Palo Alto, CA (US); Kristopher Li, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 187 days.

(21) Appl. No.: 16/098,072

(22) PCT Filed: Jul. 19, 2016

(86) PCT No.: PCT/US2016/042955
§ 371 (c)(1),
(2) Date: Oct. 31, 2018

(87) PCT Pub. No.: WO2018/017062
PCT Pub. Date: Jan. 25, 2018

(65) Prior Publication Data
US 2019/0152134 A1    May 23, 2019

(51) Int. Cl.
*B29C 64/129* (2017.01)
*B33Y 70/00* (2020.01)
(Continued)

(52) U.S. Cl.
CPC ........ *B29C 64/129* (2017.08); *B29C 35/0805* (2013.01); *B29C 64/112* (2017.08);
(Continued)

(58) Field of Classification Search
CPC ........ B29C 64/129; B33Y 10/00; B33Y 30/00
See application file for complete search history.

(56) References Cited

U.S. PATENT DOCUMENTS 6,799,959 B1    10/2004  Tochimoto et al.
2007/0238056 A1  10/2007  Baumann et al.
(Continued)

FOREIGN PATENT DOCUMENTS

CN    1976799    6/2007
CN    101932429  12/2010
(Continued)

OTHER PUBLICATIONS

Rob Davignon, 3D Printing—Panacea or Pandora's Box?, < http://www.rhventures.org/technology-insights/3D%20Printing%20%E2%80%93%20Panacea%20or%20Pandora%E2%80%99s%20Box.html > Rob Davignon N/A N/A 3D Printing—Panacea or Pandora's Box?
(Continued)

*Primary Examiner* — Joseph S Del Sole
*Assistant Examiner* — Yung-Sheng M Tsui
(74) *Attorney, Agent, or Firm* — Dicke Billig & Czaja PLLC (57) ABSTRACT

To additively manufacture a 3D object, a layer of material is deposited onto a receiving surface. Droplets are selective deposited onto first portions of the layer with at least some droplets including at least a first color agent. A gas discharge illuminant selectively induces a first amount of heating in the first portions of the layer substantially greater than a second amount of heating in second portions of the layer omitting the first color agent.

20 Claims, 4 Drawing Sheets

(51) Int. Cl.
  *B33Y 10/00* (2015.01)
  *B29C 64/112* (2017.01)
  *B29C 64/165* (2017.01)
  *B29C 64/393* (2017.01)
  *B29C 64/295* (2017.01)
  *B29C 64/264* (2017.01)
  *B33Y 30/00* (2015.01)
  *B29C 64/291* (2017.01)
  *B29C 35/08* (2006.01)

(52) U.S. Cl.
  CPC .......... *B29C 64/165* (2017.08); *B29C 64/264* (2017.08); *B29C 64/291* (2017.08); *B29C 64/295* (2017.08); *B29C 64/393* (2017.08); *B33Y 10/00* (2014.12); *B33Y 30/00* (2014.12); *B33Y 70/00* (2014.12); *B29C 2035/0822* (2013.01)

(56) References Cited

U.S. PATENT DOCUMENTS

| | | | |
|---|---|---|---|
| 2013/0274435 A1* | 10/2013 | Diekmann | C08J 3/14 528/335 |
| 2015/0181714 A1 | 6/2015 | Ahmed et al. | |
| 2016/0257843 A1* | 9/2016 | Boydston | C08J 3/28 |

FOREIGN PATENT DOCUMENTS

| | | | |
|---|---|---|---|
| CN | 103374223 | 10/2013 | |
| RU | 2469851 C2 | 12/2012 | |
| WO | 2016010590 | 1/2016 | |
| WO | WO-2016048357 | 3/2016 | |
| WO | 2016068899 | 5/2016 | |
| WO | WO-2016068899 A1 * | 5/2016 | ............ B33Y 30/00 |

OTHER PUBLICATIONS

New 3D Additive Fabrication Tool Released by NovaCentrix and nScrypt, Nov. 3, 2015, < http://www.printedelectronicsworld.com/articles/8641/new-3d-additive-fabrication-tool-released-by-novacentrix-and-nscrypt.

Sourav Das et al., Potential for Multi-functional Additive Manufacturing Using Pulsed Photonic Sintering, 2015, http://namrc-msec-2015.uncc.edu/sites/namrc-msec-2015.uncc.edu/files/media/NAMRC-Papers/paper_96_framed.

Kovalchuk et al., Prospects of application of gas-discharge electron beam guns in additive manufacturing, May 6, 2016, Twelfth international conference on electron beam technologies, pp. 36-42.

* cited by examiner

ADDITIVE MANUFACTURING INCLUDING SELECTIVE HEATING

BACKGROUND 3D printing is dramatically changing the manufacturing landscape. Via 3D printing, articles and components can be manufactured without the resources of a factory or other large scale production facility.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense. It is to be understood that features of the various examples described herein may be combined, in part or whole, with each other, unless specifically noted otherwise.

At least some examples of the present disclosure are directed to additively manufacturing a 3D object. In some examples, a method of additive manufacturing comprises depositing a layer of material onto a receiving surface, which may or may not already hold a previously deposited layer of material. In some examples, the material is a polymer material. In some examples, the material comprises a powdered material.

The method includes selectively depositing droplets including at least a first color agent onto first portions of the layer. A gas discharge illuminant selectively induces a first amount of heating in the first portions of the layer substantially greater than a second amount of heating in second portions of the layer omitting the first color agent. In some examples, the amount of heating is sometimes expressed as an amount of energy absorption in the material in the first portions or second portions.

In some examples, the first amount of heating associated with the first color agent causes fusing of the material in the first portions, and the second amount of heating does not cause fusing of the material in the second portions. In some examples, the first amount of heating is at least one order of magnitude greater than the second amount of heating.

Via this arrangement, selective heating of targeted portions of a material layer can be performed, with such heating causing fusing of the targeted portions of material by melting or sintering.

In some examples, by employing different color agents each having different absorption spectrums relative to an emission spectrum of the gas discharge illuminant, selective heating can be applied to a material layer at a different locations on the material layer according to which color agent has been deposited at respectively different locations on the material layer. In some examples, such color agents may include Cyan, Magenta, Yellow, and Black, as well as mixtures thereof, such as mixtures implementable via halftone printing and similar techniques.

Moreover, in some examples, one color agent is minimally light absorptive such that a deposit of such color agent in a particular location may reduce or substantially prevent heating in that location. In some examples, one such color agent may be white or off-white. In some examples, this arrangement may be used when the deposited material already comprises a color which is significantly light absorptive (e.g. energy absorptive) and the deposited color agent is used to selectively mask portions of the deposited material.

Moreover, in some examples, the gas discharge illuminant can perform such heating very quickly and with high intensity, such that polymer materials with high melting temperatures can be employed to additively manufacture a 3D object. In some examples, these polymer materials exhibit high strength.

In addition, the speed with which such heating via the gas discharge illuminant occurs can substantially reduce the amount of time involved to additively manufacture a 3D object because it permits faster depositing of successive layers of material.

These examples, and additional examples, are described in association with at least FIGS. 1-7.

Figure 1:
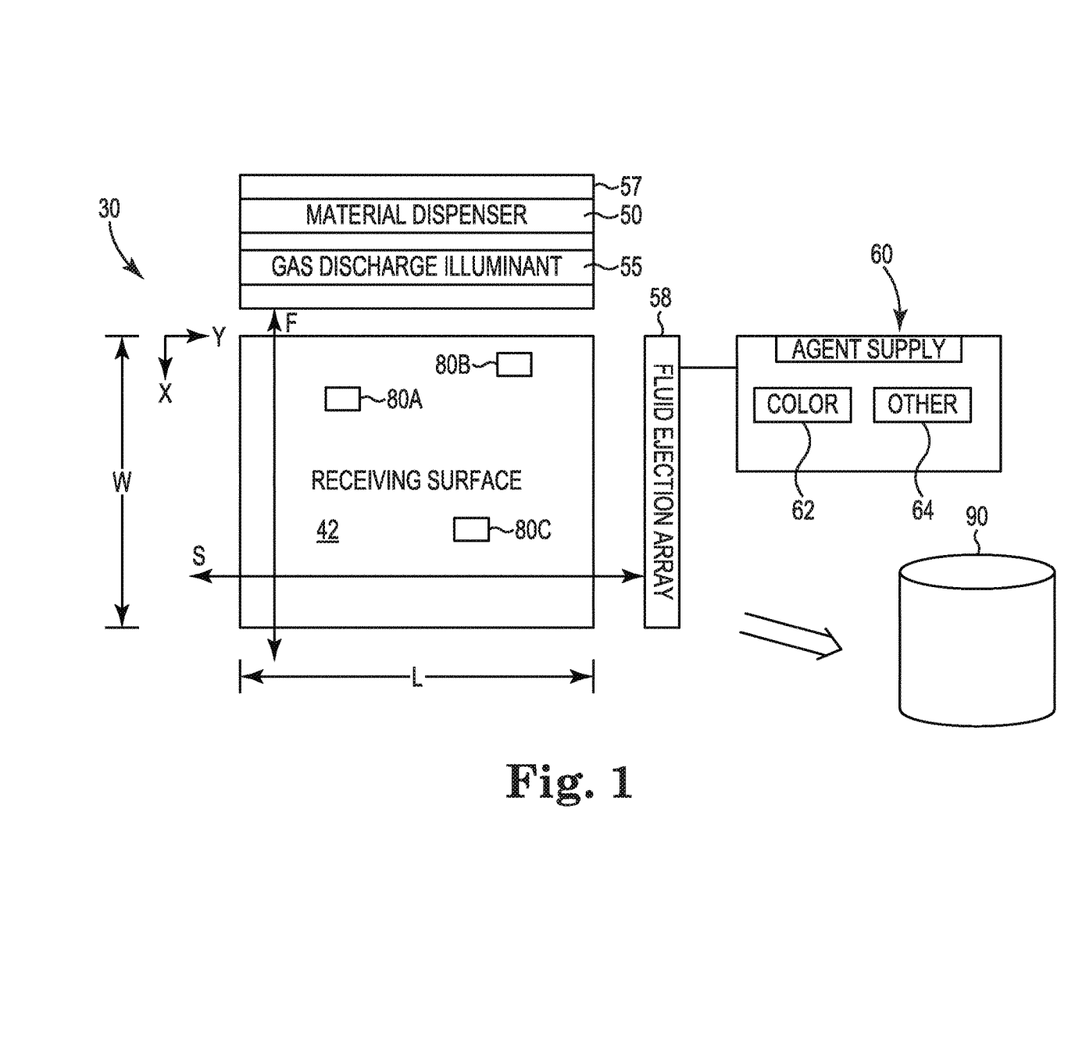
FIG. 1 is a block diagram including a top view schematically representing a device to additively manufacture a 3D object, according to one example of the present disclosure.

FIG. 1 is a diagram schematically representing a device 30 for additively manufacturing a 3D object, according to one example of the present disclosure.

As shown in FIG. 1, device 30 comprises a material dispenser 50 arranged to deposit materials onto a receiving surface 42 to additively form a 3D object, such as cylinder 90. It will be understood that a 3D object of any shape can be manufactured, and that the cylinder 90 provides just one example shape. While it will be understood that any one of various depositing or dispensing technologies may be incorporated in device 30, in some instances device 30 may sometimes be referred to as a 3D printer to refer to its ability to additively manufacture 3D objects.

In some examples, the device 30 includes a material dispenser 50, a gas discharge illuminant 55, a fluid ejection array 58, and an agent supply 60.

In some examples, the material dispenser 50 has a length (L) sufficient to deposit materials onto an entire length (L) of the receiving surface 42, such that the material dispenser 50 is capable of coating the entire receiving surface in a single pass as the material dispenser 50 travels the width (W) of the receiving surface 42. In some examples, the material dispenser 50 can selectively deposit material in lengths and patterns less than a full length of the material dispenser 50.

In some examples, the material dispenser 50 may coat the receiving surface 42 with material(s) using multiple passes instead of a single pass.

In some examples, the material dispenser 50 moves in a first orientation (represented by directional arrow F) while the fluid ejection array 58 moves in a second orientation (represented by directional arrow S) generally perpendicular to the first orientation. In some examples, the material dispenser 50 can deposit material in each pass of a back-and-forth travel path along the first orientation while the fluid ejection array 58 can deposit agents in each pass of a back-and-forth travel path along the second orientation. Of course, as previously noted, in at least some examples, one pass is completed by the material dispenser 50, followed by a pass of the fluid ejection array 58 before a second pass of the material dispenser 50 is initiated, and so on.

In some examples, the deposited material is polymer material. In some examples, the material takes the form of a powder. In some examples, the material is a non-powder material.

In some examples, the material excludes a metallic material while in some examples, the material includes a metallic material. In some examples, the material includes a conductive material.

In some examples, the material has a color which is minimally light absorptive. In some examples, the material may be white. In some examples, such minimally light absorptive material is off-white, which includes colors other than pure white but which still are minimally light absorptive.

In some examples, a minimally light absorptive color is a color which does not induce fusing (via melting or sintering) of the material upon exposure to the gas discharge illuminant 55 having an emission spectrum in the ultraviolet-visible wavelength range. In some examples, such examples of the gas discharge illuminant 55 excludes wavelengths exceeding the visible wavelength range.

In some examples, a minimally light absorptive color is a color which does not induce fusing (via melting or sintering) of the material upon exposure to the gas discharge illuminant 55 having an emission spectrum in the ultraviolet-visible-near-infrared wavelength range. In some examples, such examples of the gas discharge illuminant 55 substantially excludes wavelengths exceeding the near-infrared wavelength range.

In some examples, the material deposited via material dispenser 50 comprises high strength polymer materials. In some examples, such material comprises polyether ether ketone (PEEK), polyether ketone (PEK), polyphenylene sulfide (PPS), polytetrafluoroethylene (PTPE), perfluoroalkoxy alkanes (PFA), perfluoroploymer (PFPE), perfluorosulphonic acid (PFSA), polyethylene terephthalate (PET), polyamide 4,6 (PA46), polyamide 6, 6 (PA66), or polybutylene terephthalate (PBT).

In some examples, such high strength materials have a high melting point. In some examples, the polyether ether ketone (PEEK) material has a melting point of 350° C., the polyether ketone (PEK) material has a melting point of 360° C., the polyphenylene sulfide (PPS) material has a melting point of 280° C., the polytetrafluoroethylene (PTPE) material has a melting point of 327° C., the perfluoroalkoxy alkane (PFA) material has a melting point of 300° C., the perfluoroploymer (PFPE) material has a melting point of 300° C., the perfluorosulphonic acid (PFSA) material has a melting point of 280° C., the polyethylene terephthalate (PET) material has a melting point of 260° C., the polyamide 4,6 (PA46) material has a melting point of 295° C., the polyamide 6, 6 (PA66) material has a melting point of 255° C., and the polybutylene terephthalate (PBT) material has a melting point of 230° C.

In some examples, at least some of these melting points of the materials to be deposited may exceed a melting point of materials which form, and/or of components incorporated within, commercially available additive manufacturing devices such that attempts to apply energy to melt such high melting point materials to form a 3D object may damage the commercially available, additive manufacturing device. However, via the very fast energy emission and high intensity energy emitted by the gas discharge illuminant 55 in accordance with at least some examples of the present disclosure, such high melting point materials may be used in additive manufacturing via device 30 without damaging device 30. Accordingly, in accordance with at least some examples of the present disclosure, the gas discharge illuminant 55 enables use of high strength materials in additive manufacturing which may have been previously not utilized due to device limitations associated with such high melting temperatures.

In some examples, the material comprises a polymer having a melting temperature of at least 200° C. In some examples, the material comprises a polymer having a melting temperature of at least 300° C. In some examples, the material comprises a polymer having a melting temperature of at least 350° C. In some examples, the material comprises a polymer having a melting temperature less than 200° C.

In some examples, the fluid ejection array 58 comprises a printing mechanism, which comprises an array of printheads, each including a plurality of individually addressable nozzles for selectively ejecting agents onto receiving surface 42, as shown in FIG. 1. It will be understood that in instances in which a material layer(s) already exists on the receiving surface 42, the droplets are deposited on such material layer instead of directly onto receiving surface 42.

In some examples, fluid ejection array 58 comprises a thermal inkjet array. In some examples, the fluid ejection array 58 may eject individual droplets having a volume on the order of ones of picoliters or on the order of ones of nanoliters.

In some examples, the selective depositing of droplets is made on a voxel-by-voxel basis. A voxel is a volumetric pixel, i.e. volumetric picture element. In some examples, a resolution of 1200 voxels per inch is implemented via fluid ejection array 58.

In some examples, the fluid ejection array 58 has a width (W) capable of depositing agents onto an entire width (W) of the receiving surface 42, and therefore may sometimes be referred to as providing page-wide manufacturing (e.g. page wide printing). In such examples, via this arrangement the fluid ejection array 58 can deposit agents onto the entire receiving surface in a single pass as the fluid ejection array 58 travels the length (L1) of the receiving surface 42. In some examples, the fluid ejection array 58 may deposit agents onto a layer of material using multiple passes instead of a single pass.

However, it will be understood that the fluid ejection array 58 includes individually addressable nozzles to permit selective ejection/dispensing of droplets at target portions on receiving surface 42, such as target portions 80A, 80B, 80C shown in FIG. 1. It will be further understood that the size, quantity, and/or shape of portions 80A-80C as shown in FIG. 1 are merely representative and that other sizes, quantities, and/or shapes of target portions may be implemented.

It will be further understood that a 3D object additively formed via device 30 may have a width and/or a length less than a width (W) and/or length (L) of the receiving surface 42. In one aspect, in some examples, once formed the 3D object is separate from, and independent of, the receiving surface 42.

In some examples, agent supply 60 of device 30 is in fluid communication with fluid ejection array 58 and comprises an array of reservoirs to contain various agents, such as but not limited to, color agents 62 and other agents 64, e.g. detailing agents, supplemental fusing agents, etc. At least some of the different color agents are further described later in association with at least FIGS. 5-6. As previously mentioned, at least the color agents can facilitate heating of at least selected portions of a material layer to induce fusing, such as via melting, sintering, etc. In some examples, at least some of the color agents may be used without (i.e. excluding) a supplemental fusing agent, such as near-IR (NIR dye). In some examples, all of the color agents may be used without (i.e. excluding) a supplemental fusing agent, such as near-IR (NIR dye). Accordingly, in such examples, the color agents exclude NIR dye, i.e. are not supplemented with NIR dye or other supplemental fusing agents.

However, in some examples, a supplemental fusing agent is used in combination with a color agent(s) to further facilitate absorption of light energy emitted by the gas discharge illuminant 55. In some examples, the supplemental fusing agent comprises a near-IR (NIR) dye. In some examples, the supplemental fusing agent comprises agents other than a NIR dye.

In some examples the device 30 can be used to additively form a 3D object via a MultiJet Fusion (MJF) process (available from HP, Inc.). In some examples, an additive manufacturing process performed via device 30 does not include: selective laser sintering (SLS); selective laser melting (SLM); 3D binder printing (e.g. 3D binder jetting); fused deposition modeling (FDM); stereolithography (SLA); or curable liquid photopolymer jetting (Polyjet).

In at least some examples, the additive manufacture manufacturing process is performed in association with device 30 (FIG. 1) without subtractive manufacturing processes, such as machining, etching, etc.

In some examples, the entire additively formed 3D object is solid, while in some examples, just portions of the 3D object are solid. In some examples, the entire 3D object or portions of the 3D object are hollow, i.e. formed as wall(s) which together define a hollow interior space.

As further shown in FIG. 1, device 30 includes a gas discharge illuminant 55 for irradiating the deposited materials, agents, etc. to cause heating of the material, which may in turn result in fusing of particles of the material relative to each other, with such fusing occurring via melting, sintering, etc.

In some examples, at least majority (e.g. 51 percent) of the emission spectrum of the gas discharge illuminant 55 occurs within the ultraviolet-visible wavelength range. In some examples, at least supermajority (e.g. 67 percent) of the emission spectrum of the gas discharge illuminant 55 occurs within the ultraviolet-visible wavelength range.

In some examples, the gas discharge illuminant 55 enable high rate of energy emission per unit of time.

In some examples, the gas discharge illuminant 55 can irradiate the deposited material and agents via a single flash having an energy density between about 1 Joule per square centimeter to about 50 Joules per square centimeter, and having a duration of a few tens microseconds (e.g. 50 microseconds) to a few tens of milliseconds (e.g. 20, 30 milliseconds). In some examples, these parameters for irradiation may be achieved via a Xenon flash lamp acting as the gas discharge illuminant.

In some examples, gas discharge illuminant 55 is spaced apart from material layer by about 15 millimeters.

In some examples, the gas discharge illuminant 55 emits high intensity pulses rather than continuous (CW) illumination. In some instances, the high intensity pulses may accelerate a pace at which the target material is heated, and while potentially reducing the total amount of heat directed to non-target materials and components within (or associated with) an additive manufacturing device.

In some examples, the material dispenser 50 and the gas discharge illuminant 55 are supported by a common carriage 57, which is movable relative to receiving surface 42 along the first orientation (F). In view of the short time and high intensity of emission by the gas discharge illuminant (as later further described in association with at least FIG. 6), in some examples the gas discharge illuminant 55 emits a series of flashes in order to irradiate an entire material layer on receiving surface 42 in a single pass. This arrangement may greatly enhance the speed of additive manufacturing in comparison to some commercially available units which use several passes of an illumination unit to sufficiently irradiate a material layer to cause fusing in a method of additive manufacturing.

In some examples, the gas discharge illuminant 55 has a fixed position over or toward the receiving surface 42 and therefore is not supported by movable carriage 57. In such examples, the gas discharge illuminant 55 is supported separate from, and independent of, the material dispenser 50. In some such examples, the gas discharge illuminant 55 produces a single flash having sufficient area to irradiate the entire receiving surface 42, and therefore to irradiate the entire material layer on the receiving surface 42.

In some examples, the gas discharge illuminant 55 is supported by the movable carriage 57 as previously described. However, rather than the gas discharge illuminant 55 providing a series of flashes, the movable carriage 57 moves the gas discharge illuminant 55 to a central position over the receiving surface 42, where the gas discharge illuminant 55 emits a single flash sufficient to irradiate an entire material layer on the receiving surface 42. After this single flash, carriage 57 moves to a position from which the next pass of material dispensing can be initiated when appropriate.

In some examples, after energy is applied via gas discharge illuminant 55, additional layers of materials and/or agents may be deposited via device 30 as desired with further subsequent applications of energy via gas discharge illuminant 55.

In some examples, the gas discharge illuminant 55 comprises a pulse discharge lamp, such as a Xenon flashtube, a Krypton flash tube, an Argon flashtube, and Neon flashtubes, as well as flashtubes including various combinations of Xenon, Krypton, Argon, and Neon.

In some examples, the gas discharge illuminant 55 comprises a high intensity continuous wave (CW) discharge lamp, such as but not limited to a mercury (Hg) vapor illuminant, a metal-halide illuminant, a sodium (Na) vapor illuminant, and a Xenon short arc lamp.

In some examples, a cyclotron radiation source is substituted for the gas discharge illuminant 55.

Figures 2, 3:
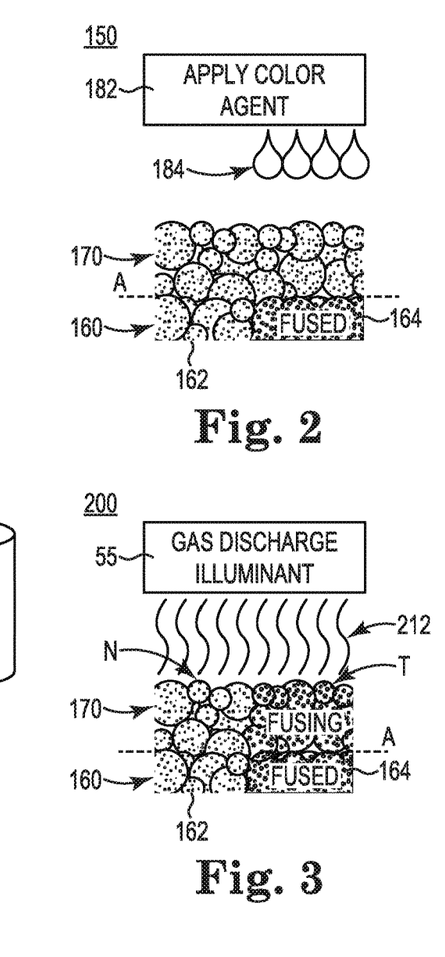
FIG. 2 is a diagram including a side view schematically representing application of a color agent during additive manufacturing of a 3D object, according to one example of the present disclosure.
FIG. 3 is a diagram including a side view schematically representing application of energy during additive manufacturing of a 3D object, according to one example of the present disclosure.

FIG. 2 is a diagram 150 including a side view schematically representing application of a color agent during additive manufacturing of a 3D object, according to one example of the present disclosure. As shown in FIG. 2, at 182 a color agent is applied (e.g. via fluid ejection array 58) as an array of droplets 184 onto a second layer 170 of material, which resides on top of a first layer 160 of material. As further shown in FIG. 2, the first layer 160 includes a non-fused portion 162 and a fused portion 164. Dashed line A represents a layer connection between first layer 160 and second layer 170. After deposition of the droplets 184 of color agent via device 30, energy is applied as further shown in FIG. 3.

FIG. 3 is a diagram 200 including a side view schematically representing application of energy during additive manufacturing of a 3D object, according to one example of the present disclosure. As shown in FIG. 3, via gas discharge illuminant 55 energy 212 is applied onto the second layer 170 of material, including the portion of second layer 170 onto which the color agent was applied. As shown in FIG. 3, because the gas discharge illuminant 55 has a emission spectrum which substantially overlaps the absorption spectrum of the color agent, the target portion (T) of the second layer heats to a temperature exceeding the melting point of the material in second layer 170, thereby resulting in fusing of the particles of the material in the target portion T. Further details regarding the substantial overlap between the absorption spectrum of the color agent and of the emission spectrum of a gas discharge illuminant, such as but not limited to, the gas discharge illuminant (e.g a Xenon flash lamp) as further described later in association with at least FIG. 6. Meanwhile, as further shown in FIG. 3, the non-target portion (N) is not fused because of the lack of color agent present at that location.

With the framework described in association with at least FIGS. 1-3, device 30 can be used to additively manufacture a 3D object in at least the following manner. Via material dispenser 50, a layer of material may be deposited onto a receiving surface. Via a single pass using fluid ejection array 58, device 30 selectively deposits droplets including at least a first color agent onto first portions of the layer. However, in some examples, multiple passes may be used to deposit the droplets. In either case, the gas discharge illuminant 55 is then used to selectively induce a first amount of energy absorption in the first portions of the layer substantially greater than a second amount of energy absorption in second portions of the layer omitting the first color agent. In some examples, a substantially greater amount of energy absorption is 3-4 times greater in the first portions than the second portions. In some examples, a substantially greater amount of energy absorption is at least 5 times greater in the first portions than the second portions. In some examples, a substantially greater amount of energy absorption is at least 10 times greater (e.g. at least one order of magnitude) in the first portions than the second portions.

In some examples, the first amount of energy absorption associated with the first color agent causes fusing of the material in the first portions, and the second amount of energy absorption does not cause fusing in the second portions. In some examples, the first amount of energy absorption is at least one order of magnitude greater than the second amount of energy.

It will be understood that as a subsequent layer of material covers any previously deposited color agents, little to no heating may occur at those locations until/unless additional light-absorptive color agents are applied to those locations after the subsequent layer of material is applied.

In some examples, for some layers, the deposited layer of material has a default color which is sufficiently light absorptive to become fused (via melting, sintering, etc.) when exposed to sufficiently high energy emissions from gas discharge illuminant 55. In such examples, prior to application of energy from gas discharge illuminant 55, the fluid ejection array 58 may selectively deposit a color agent having a second color which is minimally light-absorptive such that fusing is not induced upon exposure to energy emissions from the gas discharge illuminant 55. Via such an arrangement, the gas discharge illuminant 55 can induce fusing of the material (already having a first color) and not cause fusing of the material covered with the selectively deposited color agent (second color). In other words, the deposited color agent is used to selectively mask portions of the deposited material to achieve a desired fusing pattern of portions of the deposited material, which are not covered with a deposited color agent.

In some examples, a method of additive manufacturing via device 30 includes using material dispenser 50 to deposit a first layer of material onto a receiving surface, in a manner substantially the same as previously described above. Via fluid ejection array 58, device 30 selectively deposits droplets of at least a first color agent and of a second color agent at different locations on the first layer. The gas discharge illuminant 55 is used to induce fusing at locations of the first layer having the first color agent without inducing fusing at locations having the second color agent. In some examples, the first color agent which is generally light absorptive, and the second color agent is color which is minimally light-absorptive with the second color agent being deposited where fusing is not desired. Meanwhile, the first color agent exhibits an absorption spectrum sufficiently overlapping an emission spectrum of the gas discharge illuminant to result in fusing (via melting or sintering) of the material covered with the first color agent.

Figures 4, 5:
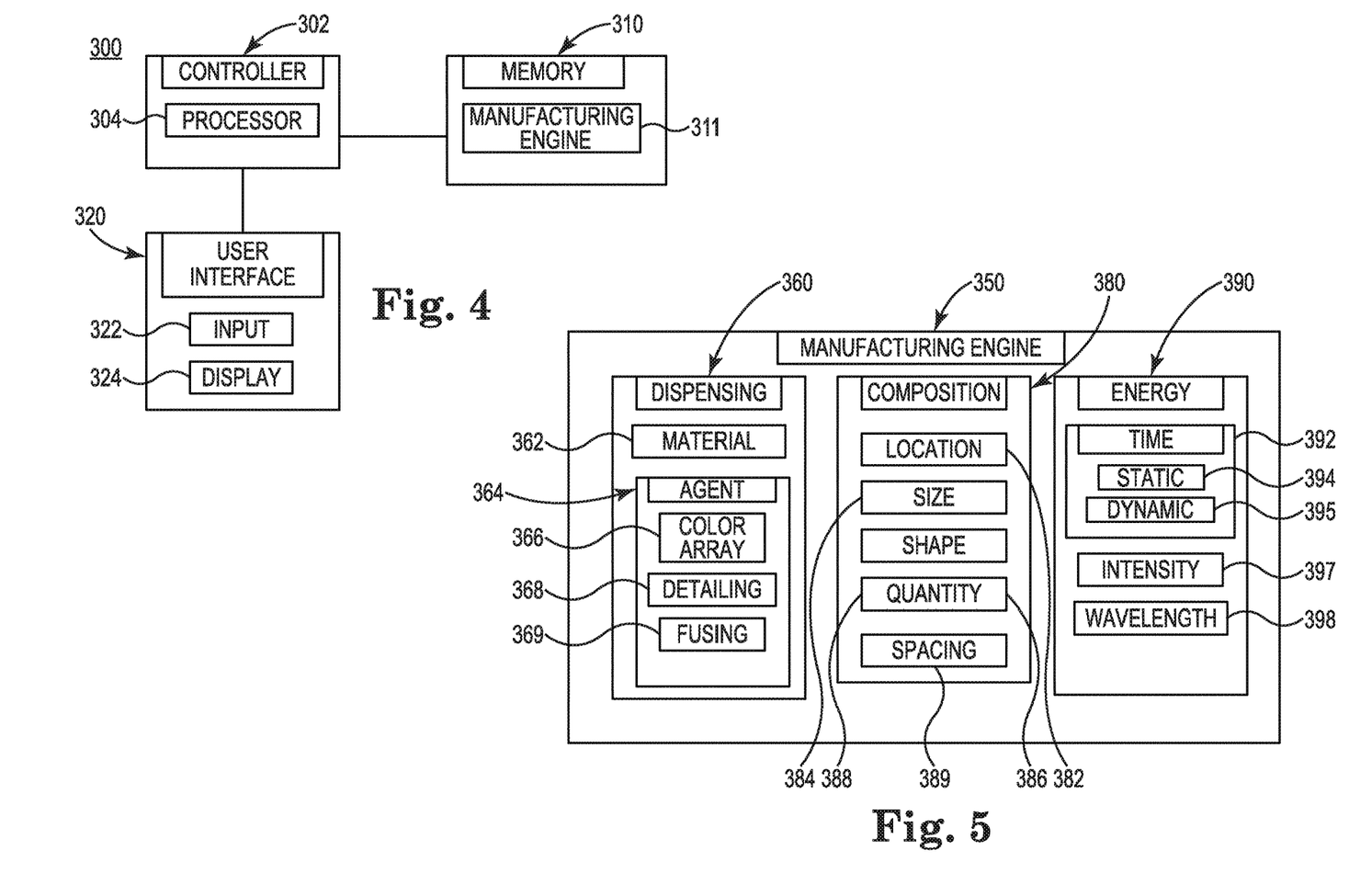
FIG. 4 is a block diagram schematically representing a control portion, according to one example of the present disclosure.
FIG. 5 is a block diagram schematically representing a manufacturing engine, according to one example of the present disclosure.

In some examples device 30 (FIG. 1) includes and/or operates in cooperation with a control portion to implement the additive manufacturing of the 3D object, with one example implementation of a control portion 300 described in association with at least FIG. 4.

FIG. 4 is a block diagram schematically representing a control portion 300, according to one example of the present disclosure.

In some examples, control portion 300 provides one example implementation of a control portion forming a part of, implementing, and/or managing any one of devices, material dispensers, agent supply, fluid ejection array, gas discharge illuminants, engines, functions, parameters, and/or methods, as represented throughout the present disclosure in association with FIGS. 1-3 and 5-7.

In some examples, control portion 300 includes a controller 302 and a memory 310.

In general terms, controller 302 of control portion 300 comprises at least one processor 304 and associated memories. The controller 302 is electrically couplable to, and in communication with, memory 310 to generate control signals to direct operation of at least some the devices, material dispensers, agent supply, fluid ejection array, gas discharge illuminants, engines, functions, parameters, and/or methods, as represented throughout the present disclosure. In some examples, these generated control signals include, but are not limited to, employing manufacturing engine 311 stored in memory 310 to at least direct and manage additive manufacturing of 3D objects in the manner described in at least some examples of the present disclosure.

In response to or based upon commands received via a user interface (e.g. user interface 320 in FIG. 4) and/or via machine readable instructions, controller 302 generates control signals to implement additive manufacture of 3D object in accordance with at least some of the examples of the present disclosure. In some examples, controller 302 is embodied in a general purpose computing device while in some examples, controller 302 is incorporated into or associated with at least some of the associated devices, material dispensers, agent supply, fluid ejection array, gas discharge illuminants, engines, functions, parameters, and/or methods etc. described throughout the present disclosure.

For purposes of this application, in reference to the controller 302, the term "processor" shall mean a presently developed or future developed processor (or processing resources) that executes sequences of machine readable instructions contained in a memory. In some examples, execution of the sequences of machine readable instructions, such as those provided via memory 310 of control portion 300 cause the processor to perform actions, such as operating controller 302 to implement additive manufacturing of 3D objects as generally described in (or consistent with) at least some examples of the present disclosure. The machine readable instructions may be loaded in a random access memory (RAM) for execution by the processor from their stored location in a read only memory (ROM), a mass storage device, or some other persistent storage (e.g., non-transitory tangible medium or non-volatile tangible medium), as represented by memory 310. In some examples, memory 310 comprises a computer readable tangible medium providing non-volatile storage of the machine readable instructions executable by a process of controller 302. In other examples, hard wired circuitry may be used in place of or in combination with machine readable instructions to implement the functions described. For example, controller 302 may be embodied as part of at least one application-specific integrated circuit (ASIC). In at least some examples, the controller 302 is not limited to any specific combination of hardware circuitry and machine readable instructions, nor limited to any particular source for the machine readable instructions executed by the controller 302.

In some examples, control portion 300 is entirely implemented within or by a stand-alone device, which has at least some of substantially the same features and attributes as device 30 as previously described in association with at least FIGS. 1-3. In some examples, the control portion 300 is partially implemented in the device 30 and partially implemented in a computing resource separate from, and independent of, the device 30 but in communication with the device 30.

In some examples, control portion 300 includes a user interface 320 as shown in FIG. 4. In some examples, user interface 320 comprises a user interface or other display that provides for the simultaneous display, activation, and/or operation of at least some of the devices, material dispensers, agent supply, fluid ejection array, gas discharge illuminants, engines, functions, parameters, and/or methods, as described in association with FIGS. 1-3 and 5-7. In some examples, at least some portions or aspects of the user interface 320 are provided via a graphical user interface (GUI), and may comprise a display 324 and input 322.

FIG. 5 is a block diagram schematically representing a manufacturing engine 350, according to one example of the present disclosure. In some examples, manufacturing engine 350 provides one example implementation of manufacturing engine 311 in control portion 300 in FIG. 4. In some examples, control portion manufacturing engine 350 comprises at least some of substantially the same features and attributes of manufacturing engine 311 in association with FIG. 4.

As shown in FIG. 5, in some examples, manufacturing engine 350 comprises a dispensing engine 360, a composition engine 380, and/or an energy engine 390. In some examples, the manufacturing engine 350 directs and manages additive manufacturing of a 3D object, including deposition of material relative to a receiving surface to additively form a three-dimensional (3D) object.

In general terms, the dispensing engine 360 enables the selection (automatically or manually) of materials, agents, etc. to be deposited onto a receiving surface and/or a partially formed 3D object. In some examples, the dispensing engine 360 comprises a material parameter 362. Via the material parameter 362, the manufacturing engine 350 specifies which material(s) and the quantity of such materials which can be used to additively form a body of the 3D object. In some examples, these materials are deposited via material dispenser 50 of device 30 (FIG. 1).

The materials may comprise polymers, ceramics, etc. having sufficient strength, formability, toughness, etc. for the intended use of the 3D object with at least some example materials being previously described in association with FIG.

In some examples, the dispensing engine 360 comprises an agent function 364 to specify which agents are to be selectively deposited onto a previously deposited layer of material and/or other agents. In some examples, such agents are deposited via fluid ejection array 58 (FIG. 1). In some examples, the agent function 364 includes a color array parameter 366, a detailing parameter 368, and a fusing parameter 369.

The color array parameter 366 enables selection of different color agents and mixtures thereof which may be deposited. In some examples, the different color agents may comprise Cyan, Magenta, Yellow, and Black. However, other color agents, including spot colors may be used. At least some aspects associated with such color agents selectable via color array parameter 366 are further described later in association with at least FIG. 6. Via absorption of light energy from the gas discharge illuminant 55, the color agents may facilitate fusing of the material.

In some examples, the detailing parameter 368 controls deposition of a detailing agent to complement fusing of the deposited materials, while the fusing parameter 366 controls deposition of a supplemental fusing agent which may, in cooperation with the color agents, facilitate fusing of the deposited materials into a monolithic structure. In some examples, other agents or additional agents are deposited selectively. It will be understood that in at least some examples, the supplemental fusing agents are omitted and not deposited onto the material with the color agents (selectively deposited onto the material) being sufficient to induce adequate heating and melting of the material targeted for fusing.

It will be understood that in some examples the dispensing engine 360 is not limited to specifying the types of materials, agents, etc. associated with parameters 362, 366, 368, 369 shown in FIG. 5, but instead may specify any type of material, agent, etc. conducive to additively manufacturing a 3D object, with such type of materials, agents, etc. depending on the size, type, shape, use, etc. of the 3D object, and depending on the particular type of method used to perform the additive manufacturing of the 3D object.

Each of the different respective types of agents, etc. can be contained separately in different reservoirs (e.g. 62, 64 in FIG. 1) of an agent supply station 60 and selectively drawn as desired during the additive manufacturing of the 3D object. Similarly, to the extent that different materials used per parameter 362, then each different material may be contained in separate reservoir until deposited via dispenser 50 (FIG. 1).

In general terms, the composition engine 380 of manufacturing engine 350 enables the selection (automatically or manually) of attributes by which the selected agents are deposited. For instance, in some examples the composition engine 380 comprises a location parameter 382, a size parameter 384, a shape parameter 386, a quantity parameter 388, and a spacing parameter 389. The location parameter 382 can specify a location at which the various agents and/or a structural features of the 3D object is located. For instance, the location parameter 382 can specify a location at which a color agent is to deposited to cause fusing (e.g. via melting, via sintering, etc.) of a layer of material. Meanwhile, the size parameter 384 can specify a size of the area over which the particular agent (e.g. color, detailing, etc.) is deposited. The size can be specified as an absolute quantity or as a relative quantity, i.e. a size relative to a size or volume of the surrounding material not receiving a particular agent.

In some examples, the shape parameter 386 enables specifying a shape over which a particular agent is deposited, which can be absolute or relative to the general shape of the 3D object. In some examples, the quantity parameter 388 enables specifying a quantity of locations at which a particular agent is deposited on a layer of material. In some examples, the spacing parameter 389 enables specifying a spacing between multiple locations at which a particular agent is deposited.

In general terms, the energy engine 390 of manufacturing engine 350 enables specifying various processing steps on the deposited materials and agents, such as applying energy to cause fusing, etc. of the deposited materials.

In some examples, the energy function 390 comprises a time function 392, an intensity parameter 397, and a wavelength parameter 398. The time function 392 comprises a static parameter 394 and a dynamic parameter 395.

In some examples, the time function 392 specifies an amount of time that energy from the gas discharge illuminant 55 is emitted toward the material, agents, etc. on the receiving surface 42. In some examples, the gas discharge illuminant 55 irradiates the material layer in a single flash. Accordingly, the gas discharge illuminant 55 may remain stationary (i.e. static) during such emission with the time of irradiation being specified via static parameter 394. However, in some examples in which the gas discharge illuminant 55 moves over the materials, agents, etc. (on the receiving surface 42) during a series of flashes, the dynamic parameter 395 can specify a total amount of time of emission or a time of emission per flash.

In some examples, the intensity parameter 397 control the energy intensity emitted by the gas discharge illuminant 55 while the wavelength parameter 398 selectively controls a range of the wavelength spectrum emittable by the gas discharge illuminant 55.

Figure 6:
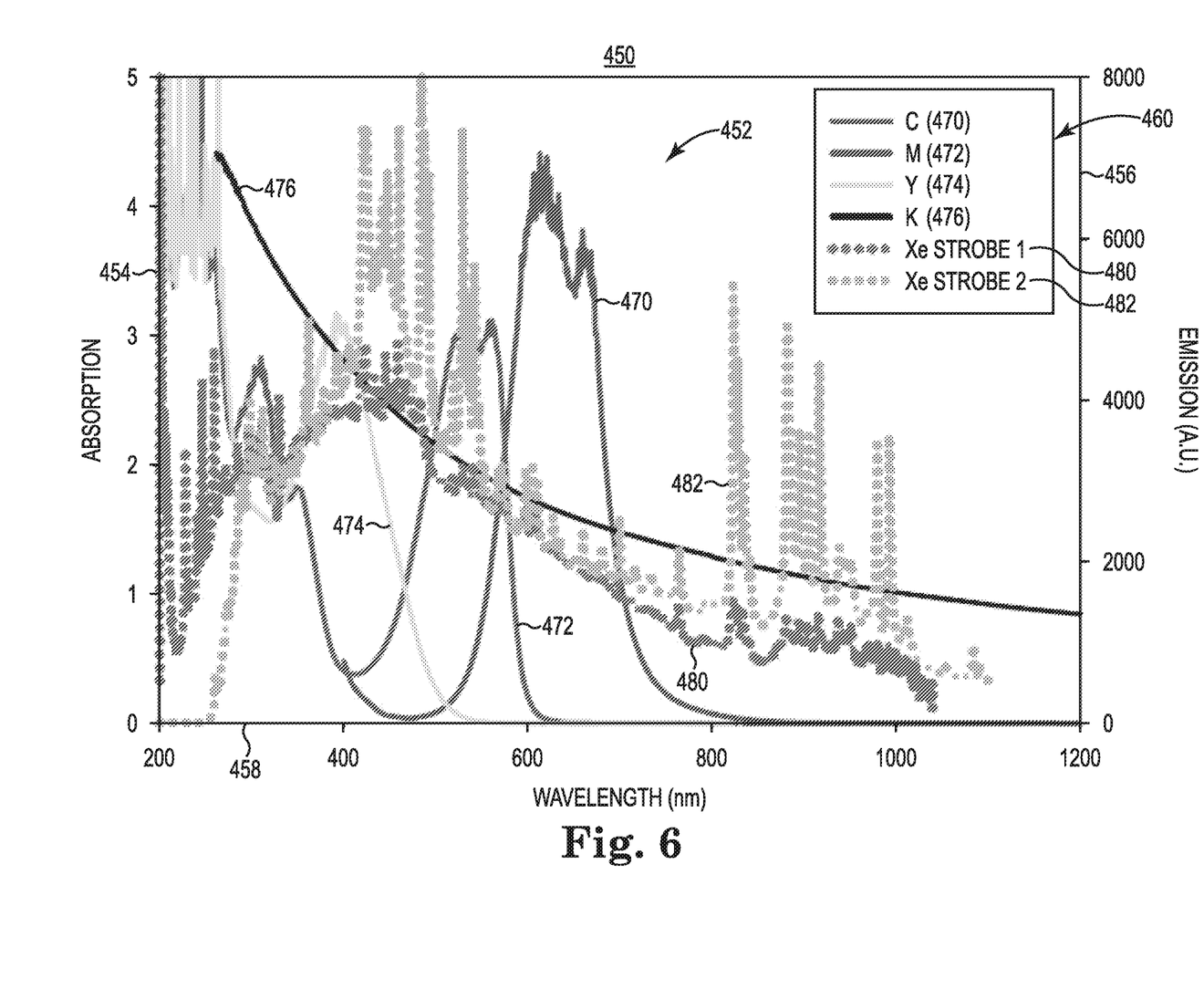
FIG. 6 is graph schematically illustrating information regarding energy emission and absorption, according to one example of the present disclosure.

FIG. 6 is a diagram 450 including a graph 452 schematically illustrating absorbance and emission, according to one example of the present disclosure.

As shown in FIG. 6, diagram 450 includes a first y-axis 454 representing absorbance, a second y-axis 456 representing emission (a.u.), and an x-axis 458 representing a wavelength (nanometers). Via legend 460, each color agent (e.g. Cyan, Magenta, Yellow, Black) is labeled according to a corresponding line pattern and associated reference numeral (e.g. 470, 472, 474, 478, respectively). In addition, legend 460 provides labeling according to a corresponding line pattern and associated reference numeral and their associated 480, 482 for two different example gas discharge illuminants, such as Xenon flash lamps (e.g. Xe strobe 1 and Xe strobe 2, respectively.)

In one aspect, the graph 452 juxtaposes the emission spectrum of the respective Xenon flash lamps as represented via lines 480, 482 relative to the absorption spectrum of each of the respective color agents (C—470; M—472; Y—474; and K—478). From this juxtaposition, it can be seen that a significant overlap occurs between the energy emission of lamps 480, 482 above 2000 a.u. and the absorption of Yellow—474 in the wavelength range from about 300 to about 425 nanometers. With further reference to graph 452, it can be seen that a significant overlap occurs between the energy emission of lamps 480, 482 above 2000 a.u. and the absorption of the color agent Magenta—472 in the wavelength range from about 500 to about 600 nanometers. With further reference to graph 452, it can be seen that a significant overlap occurs between the energy emission of lamps 480, 482 above 2000 a.u. and the absorption of the color agent Cyan—474 in the wavelength range from about 550 to about 700 nanometers. This information indicates that sufficient overlap occurs between the wavelength spectrum of the Xenon flash lamps and the wavelength of the respective Yellow, Magenta, and Cyan color agents such that a substantial majority of energy emitted by the flash lamps 480, 482 is absorbed by the respective color agents Yellow, Magenta, and/or Cyan.

Via this arrangement, a substantial overlap occurs between the absorption spectrum of the color agents (e.g., Cyan, Magenta, Yellow) and the emission spectrum of the Xenon flash lamps.

In some examples, a gas discharge illuminant as disclosed throughout at least some examples of the present disclosure may be an ultraviolet (UV)-visible gas discharge illuminant, which substantially excludes wavelengths greater than the near-infrared (IR) emission spectrum.

In some examples of such an ultraviolet (UV)-visible gas discharge illuminant, the gas discharge illuminant also excludes wavelengths in the near-IR (NIR) spectrum. In other words, such an ultraviolet (UV)-visible gas discharge illuminant substantially excludes wavelengths greater than the ultraviolet-visible emission spectrum.

Figure 7:
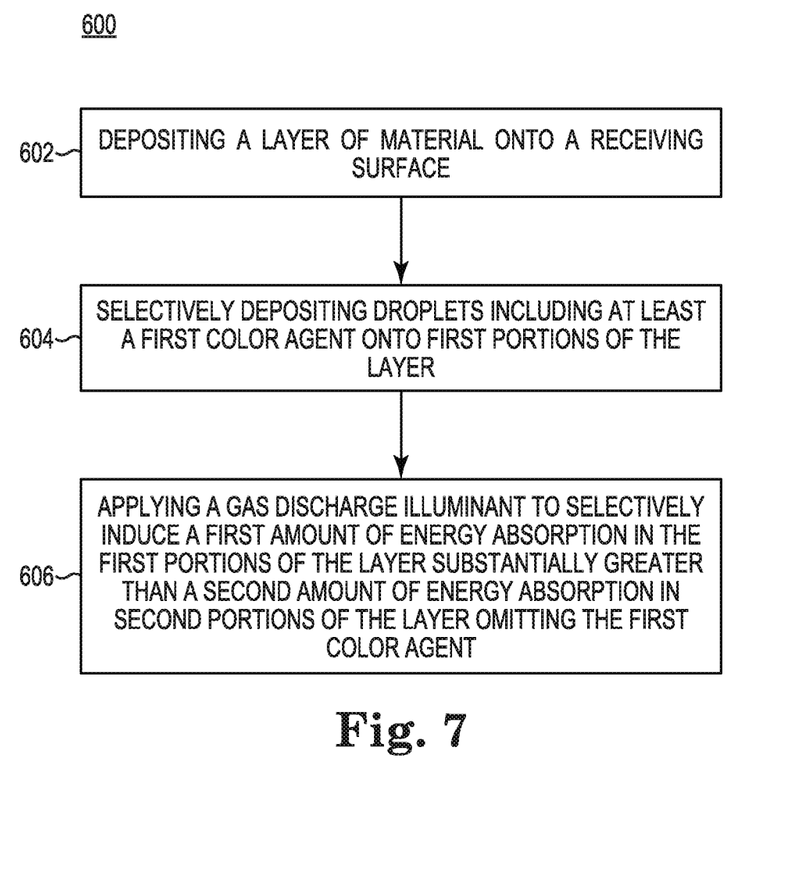
FIG. 7 is a flow diagram schematically representing a method of additively manufacturing a 3D object, according to one example of the present disclosure.

FIG. 7 is a flow diagram schematically representing a method of manufacturing a 3D object, according to one example of the present disclosure. In some examples, method 600 is performed via at least some of the material dispensers, fluid ejection arrays, agent supply, gas discharge illuminants, devices, engines, function, methods, as previously described in association with at least FIGS. 1-6. In some examples, method 600 is performed via at least some of the material dispensers, fluid ejection arrays, agent supply, gas discharge illuminants, devices, engines, function, methods other than those previously described in association with at least FIGS. 1-6. In particular, in some examples, method 600 is implemented via at least a manufacturing engine, such as manufacturing engine 250 in FIG. 5.

As shown in FIG. 7, at 602 method 600 comprises depositing a layer of material relative a receiving surface to additively form a monolithic 3D object. In some examples in which a previous layer of material and/or agents already have been deposited onto the receiving surface, then later layers of material are no longer deposited directly onto the receiving surface but rather onto the previously deposited materials, agents, etc.

At 604, method 600 comprises selectively depositing droplets including at least a first color agent onto first portions of the layer of material. At 606, method 600 includes applying a gas discharge illuminant to selectively induce a first amount of energy absorption in the first portions of the layer substantially greater than a second amount of energy absorption in second portions of the layer which omit the first color agent.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein.

The invention claimed is:

1. A method of additive manufacturing comprising:
depositing a layer of material onto a receiving surface;
via a single pass using a page wide fluid ejection array, selectively depositing droplets including at least a first color agent onto first portions of the layer; and
applying a gas discharge illuminant to selectively induce a first amount of energy absorption in the first portions of the layer substantially greater than a second amount of energy absorption in second portions of the layer omitting the first color agent.

2. The method of claim 1, wherein the first amount of energy absorption associated with the first color agent causes fusing of the material in the first portions, and the second amount of energy absorption does not cause fusing in the second portions.

3. The method of claim 1, wherein the first amount of energy absorption is at least one order of magnitude greater than the second amount of energy.

4. The method of claim 1, wherein the material comprises a polymer having a melting temperature of at least 200° C.

5. The method of claim 4, wherein the material is selected from the group including polyether ether ketone (PEEK), polyether ketone (PEK), polyphenylene sulfide (PPS), polytetrafluoroethylene (PTPE), perfluoroalkoxy alkanes (PFA), perfluoroploymer (PFPE), perfluorosulphonic acid (PFSA), polyethylene terephthalate (PET), polyamide 4,6 (PA46), polyamide 6, 6 (PA66), polybutylene terephthalate (PBT).

6. An additive manufacturing device comprising:
a material dispenser;
a page wide array of fluid ejection nozzles;
a gas discharge illuminant; and
a control portion programmed to execute instructions to:
deposit, via the material dispenser, a first layer of material onto a receiving surface;
selectively deposit, via the fluid ejection nozzles, droplets of at least a first color agent and of a second color agent at different locations on the first layer; and
induce fusing, via the gas discharge illuminant, at locations of the first layer having the first color agent without inducing fusing at locations having the second color agent.

7. The device of claim 6, wherein the control portion is programmed to execute instructions to selective deposit the first color agent having an absorbance, relative to an emission spectrum of the gas discharge illuminant, which is substantially greater than an absorbance of the second color agent relative to the emission spectrum of the gas discharge illuminant.

8. The device of claim 6, wherein the control portion is programmed to execute instructions to selective deposit the first color agent as having an absorbance at least one order of magnitude greater than an absorbance of the second color agent.

9. The device of claim 6, wherein the control portion is programmed to execute instructions to:
deposit, via the material dispenser, the first layer of the material comprising a polymer having a melting temperature of at least 200° C., and the material is selected from the group including polyether ether ketone (PEEK), polyether ketone (PEK), polyphenylene sulfide (PPS), polytetrafluoroethylene (PTPE), perfluoroalkoxy alkanes (PFA), perfluoroploymer (PFPE), perfluorosulphonic acid (PFSA), polyethylene terephthalate (PET), polyamide 4,6 (PA46), polyamide 6, 6 (PA66), polybutylene terephthalate (PBT).

10. The device of claim 6, wherein the gas discharge illuminant has an emission spectrum substantially excluding wavelengths greater than wavelengths of the near-infrared (NIR) emission spectrum.

11. The device of claim 6, comprising:
a control portion programmed to execute instructions to select, via a color array parameter, deposition of colors from an array of color agents, including the first color agent and the second color agent,
wherein at least the first color agent has an absorbance spectrum substantially overlapping with an emission spectrum of the gas discharge illuminant and the second color agent has an absorbance spectrum relative to the emission spectrum of the gas discharge illuminant by which fusing is not induced at the locations having the second color agent.

12. The device of claim 11, wherein the control portion is programmed to execute instructions to select at least one of:
locations at which a respective color agent is deposited applied;
a size of an area over which a respective color agent is deposited;
a shape of an area over which a respective color agent is deposited;
a quantity of locations at which the respective color agents are deposited; and
a spacing between locations at which the respective color agents are deposited.

13. The device of claim 11, wherein the control portion is programmed to execute instructions to select applying energy from the gas discharge illuminant according to at least one of:
a static parameter in which the gas discharge illuminant is stationary during energy application; and
a dynamic parameter in which the gas discharge illuminant moves in a single pass over the receiving area during energy application to achieve fusing the material at locations having the first color agent.

14. An additive manufacturing device comprising:
a processing resource;
a non-transitory computer readable medium storing instructions, which when executed via the processing resource, is to:
deposit a layer of polymer material onto a receiving surface;
selectively deposit droplets including at least a first color agent onto first portions of the layer; and
selectively induce, via a gas discharge illuminant, a first amount of heating in the first portions of the layer substantially greater than a second amount of heating in second portions of the layer omitting the first color agent.

15. The additive manufacturing device of claim 14, wherein the processing resource is to execute the machine-readable instructions to:
apply a single flash of the gas discharge illuminant for a duration of about 100 microsecond to 300 milliseconds.

16. The additive manufacturing device of claim 15, wherein the gas discharge illuminant comprises a Xenon flash lamp.

17. The additive manufacturing device of claim 15, wherein the processing resource is to execute the machine-readable instructions to deposit the layer of polymer material having a melting temperature of at least 200° C.

18. The additive manufacturing device of claim 14, wherein the first color agent comprises a first color composition including at least a cyan color, a magenta color, and/or a yellow color.

19. The additive manufacturing device of claim 18, wherein the processing resource is to execute the machine-readable instructions to deposit a second color agent in the second portions of the layer, wherein the second color agent comprises a different second color composition including at least the cyan color, the magenta color, and/or the yellow color, and wherein the first color composition has an absorbance, relative to an emission spectrum of the gas discharge illuminant, which is substantially greater than an absorbance of the second color composition relative to the emission spectrum of the gas discharge illuminant.

20. The additive manufacturing device of claim 6, wherein the control portion is programmed to execute the instructions to specify the first color agent as including a first composition including a first amount of cyan color, a first amount of a magenta color, a first amount of a yellow color, or combinations thereof, and to specify the second color agent as a second composition including a second amount of cyan color, a second amount of magenta color, a second amount of yellow color, or combinations thereof.

* * * * *